United States Patent
Cho et al.

(10) Patent No.: US 10,724,507 B2
(45) Date of Patent: Jul. 28, 2020

(54) ACTIVE CLUTCH MECHANISM AND HOPPING ROBOT HAVING SAME

(71) Applicant: Seoul National University R&DB Foundation, Seoul (KR)

(72) Inventors: Kyu Jin Cho, Seoul (KR); Gwang Pil Jung, Changwon-si (KR); Sun Pill Jung, Seoul (KR); Woong Bae Kim, Busan (KR)

(73) Assignee: Seoul National University R&DB Foundation, Seoul (KR)

( * ) Notice: Subject to any disclaimer, the term of this patent is extended or adjusted under 35 U.S.C. 154(b) by 88 days.

(21) Appl. No.: 16/088,018

(22) PCT Filed: Mar. 21, 2017

(86) PCT No.: PCT/KR2017/003002
§ 371 (c)(1),
(2) Date: Sep. 24, 2018

(87) PCT Pub. No.: WO2017/164610
PCT Pub. Date: Sep. 28, 2017

(65) Prior Publication Data
US 2019/0101106 A1      Apr. 4, 2019

(30) Foreign Application Priority Data

Mar. 25, 2016    (KR) .......................... 10-2016-0036037

(51) Int. Cl.
*F16H 1/06*       (2006.01)
*F03G 7/08*       (2006.01)
(Continued)

(52) U.S. Cl.
CPC .................. *F03G 7/08* (2013.01); *B25J 9/10* (2013.01); *F16D 19/00* (2013.01); *F16H 1/06* (2013.01)

(58) Field of Classification Search
CPC .... F03G 7/08; F16D 19/00; F16H 1/06; B25J 9/10; B25J 9/0009; B25J 9/102; B25J 9/1065; B25J 9/1085
See application file for complete search history.

(56) References Cited

U.S. PATENT DOCUMENTS 10,100,698 B2 * 10/2018 Minezawa ................ F01N 3/08
2003/0137268 A1    7/2003 Papanikolopoulos et al.
(Continued)

FOREIGN PATENT DOCUMENTS

KR          10-0857540 B1      9/2008
KR          10-1097831 B1     12/2011
(Continued)

OTHER PUBLICATIONS

International Search Report issued in International Application No. PCT/KR2017/003002, dated Jun. 26, 2017 (4 pages).
(Continued)

*Primary Examiner* — David J Hlavka
(74) *Attorney, Agent, or Firm* — Osha Liang LLP (57) ABSTRACT

The present invention provides an active clutch mechanism and a hopping robot equipped with the same, the active clutch mechanism comprising: a sun gear; a planetary gear; and a winding gear. When the sun gear rotates in one direction, the planetary gear revolves around the sun gear in the one direction to come into contact with the winding gear, and then rotates the winding gear to wind a wire so as to store energy in an energy storage unit connected to the winding gear. When the sun gear rotates in a direction opposite to the one direction, the planetary gear revolves around the sun gear in the direction different from the one direction to become spaced from the winding gear, so as to discharge the energy stored in the energy storage unit.

15 Claims, 4 Drawing Sheets

(51) Int. Cl.
    *F16D 19/00*    (2006.01)
    *B25J 9/10*    (2006.01)

(56) References Cited

U.S. PATENT DOCUMENTS

| | | | |
|---|---|---|---|
| 2014/0251748 A1* | 9/2014 | McCrary | F16D 19/00 192/94 |
| 2016/0369892 A1* | 12/2016 | Cibien | F16H 63/04 |
| 2019/0128060 A1* | 5/2019 | Whitmire | E06B 9/322 |
| 2020/0047332 A1* | 2/2020 | Salisbury, Jr. | F16H 48/12 |

FOREIGN PATENT DOCUMENTS

| | | |
|---|---|---|
| KR | 10-1166870 B1 | 7/2012 |
| KR | 10-1489156 B1 | 2/2015 |

OTHER PUBLICATIONS

Written Opinion issued in International Application No. PCT/KR2017/003002, dated Jun. 26, 2017 (8 pages).

\* cited by examiner

ACTIVE CLUTCH MECHANISM AND HOPPING ROBOT HAVING SAME

TECHNICAL FIELD

The present invention relates to an active clutch mechanism configured to store elastic energy and discharge the stored energy at the desired time, and a hopping robot having the same.

BACKGROUND ART

Demands for robots are increasing, not only for industrial use but also for home use, and thus research on the robots is actively carried out. Particularly, research on mobile robots, which are capable of moving unlike the conventional fixed position robots, is actively carried out.

Meanwhile, there are hopping mechanisms which store elastic energy and discharge the stored energy at the desired time, however, the conventional hopping mechanisms use at least two actuators to achieve the mechanisms, so that the system may be complicated and weight thereof may be increased.

DISCLOSURE

Technical Problem

The present invention is directed to providing an active clutch mechanism capable of controlling a height thereof by storing elastic energy with one actuator and discharging the stored energy at the desired time, and a hopping robot having the same.

The present invention is also directed to providing an active clutch mechanism which causes a hopping to occur at a desired timing using one actuator, and a hopping robot having the same.

Technical Solution

One aspect of the present invention provides an active clutch mechanism including: a sun gear connected to a motor and configured to be rotatable around a rotation shaft by receiving a driving power of the motor; a planetary gear arranged to come into contact with the sun gear and configured to revolve around the sun gear, and which rotates around a rotation shaft spaced apart from the rotation shaft of the sun gear; and a winding gear selectively brought into contact with the planetary gear and configured to be rotatable around a rotation shaft by rotation of the planetary gear, and, when the sun gear is rotated in one direction, the planetary gear revolves around the sun gear in the one direction and comes into contact with the winding gear to rotate the winding gear and to wind a wire so that energy is stored in an energy storage portion connected to the winding gear, and when the sun gear is rotated in a direction opposite to the one direction, the planetary gear revolves around the sun gear in a direction different from the one direction to be spaced apart from the winding gear so that the energy stored in the energy storage portion is able to be discharged.

According to one example related to the present invention, the active clutch mechanism further includes: a casing configured to accommodate the sun gear, the planetary gear, and the winding gear; and a support plate including a coupling portion extending downward and installed at one end of the casing.

The casing may include an inner side plate which is connected to the casing and supports the planetary gear, and the inner side plate may include a guide portion configured to guide the rotation shaft of the planetary gear such that the planetary gear revolves in a circumferential direction of a center of the rotation shaft of the sun gear.

The guide portion may be a cut-out portion formed by being cut from the inner side plate to allow the planetary gear to revolve in the circumferential direction of the center of the rotation shaft of the sun gear, and the rotation shaft of the planetary gear may he arranged in the cut-out portion.

The rotation shaft of the planetary gear may be configured to move to one side of the cut-out portion for the planetary gear to come into contact with the winding gear when the sun gear rotates in one direction, and the rotation shall of the planetary gear may be configured to move to the other side of the cut-out portion for the planetary gear to be spaced apart from the winding gear when the sun gear rotates in a direction opposite to the one direction.

According to another example related to the present invention, the energy storage portion is made of an elastic material, and the energy stored in the energy storage portion is elastic energy.

According to still another example related to the present invention, a wire, which is configured to be wound or unwound according to the rotation of the winding gear, may be installed between the rotation shaft of the winding gear and the energy storage portion, and the wire may transmit a driving power from the winding gear to the energy storage portion.

The active clutch mechanism may further includes: a casing configured to accommodate the sun gear, the planetary gear, and the winding gear; a support plate including a coupling portion extending downward and installed at one end of the casing; and a link which is installed in the coupling portion, supported by the wire, and vertically arranged to be folded by the winding of the wire.

Another aspect of the present invention provides a hopping robot including: a sun gear connected to a motor and configured to he rotatable around a rotation shaft by receiving a driving power of the motor; a planetary gear arranged to come into contact with the sun gear and configured to revolve around the sun gear, and which rotates around a rotation shaft spaced apart from the rotation shaft of the sun gear; a winding gear selectively brought into contact with the planetary gear and configured to be rotatable by rotation of the planetary gear; a casing configured to accommodate the sun gear, the planetary gear, and the winding ear; a support plate including a coupling portion extending downward and installed at one end of the casing; first and second links each of which having one end rotatably installed in the coupling portion; third and fourth links rotatably installed at the other ends of the first and second links, respectively, and including a contact portion at which one ends thereof are brought into contact with each other; a pulley connected to the winding gear to rotate with the winding gear; and a wire installed to be wound around the pulley and the contact portion to compress or stretch the first to fourth links, and when the sun gear is rotated in one direction, the planetary gear revolves around the sun gear in the one direction and comes into contact with the winding gear to rotate the winding gear so that the first to fourth links are compressed to store energy, and when the sun gear is rotated in a direction opposite to the one direction, the planetary gear revolves around the sun gear in the direction opposite to the one direction and is spaced apart from the winding gear to discharge the energy.

According to one example related to the present invention, the hopping robot further includes an elastic member installed in the first to fourth links in an intersecting direction, and elastically deformed by an operation of the first to fourth links, and the energy is elastic energy which is stored and discharged through the elastic member.

The elastic member may be extended in a direction intersecting with a direction in which the first to fourth links are stretched or compressed, and may be configured to be compressed to store the elastic energy when the first to fourth links are stretched and to be stretched to discharge the elastic energy when the first to fourth links are compressed.

First and second holding portions may be respectively formed at ends of the first and second links, and third and fourth holding portions are respectively formed at ends of the third and fourth links, and the elastic member may include: a first elastic member installed in the first and second holding portions to be held in a direction intersecting with the wire; and a second elastic member installed in the third and fourth holding portions to be held in the direction intersecting with the wire.

Materials of the first and second elastic members may include latex.

According to another example related to the present invention, the casing may include an inner side plate which is connected to the casing and supports the planetary gear, and the inner side plate may include a guide portion configured to guide the rotation shaft of the planetary gear such that the planetary gear revolves in a circumferential direction of a center of the rotation shaft of the sun gear.

The guide portion may be a cut-out portion formed by being cut from the inner side plate to allow the planetary gear to revolve in the circumferential direction of the center of the rotation shaft of the sun gear, and the rotation shaft of the planetary gear may be arranged in the cut-out portion.

The rotation shaft of the planetary gear may he configured to move to one side of the cut-out portion for the planetary gear to come into contact with the winding gear when the sun gear rotates in one direction, and the rotation shaft of the planetary gear may be configured to move to the other side of the cut-out portion for the planetary gear to be spaced apart from the winding gear when the sun gear rotates in the other direction opposite to the one direction.

According to another example related to the present invention, the wire and the first to fourth links are arranged in a direction parallel to each other in a state in which the first to fourth links receive a tensile force.

Advantageous Effects

An active clutch mechanism and a hopping robot having the same of the present invention can adjust a height of the hopping robot using a plurality of gears connected to each other and one actuator and allows the robot to hop at a desired time.

Also, an active clutch mechanism and a hopping robot having the same of the present invention can store elastic energy and discharge the stored elastic energy at the desired time.

MODES OF THE INVENTION

Hereinafter, embodiments disclosed in this specification will be described in detail with reference to the attached drawings. The attached drawings are provided to easily understand the embodiments disclosed in this specification, and it is to be understood that the technical spirit disclosed in this specification is not limited by the attached drawings and the drawings include all the changes, equivalents, and substitutions included in the spirit and technical scope of the present invention.

Figure 1:
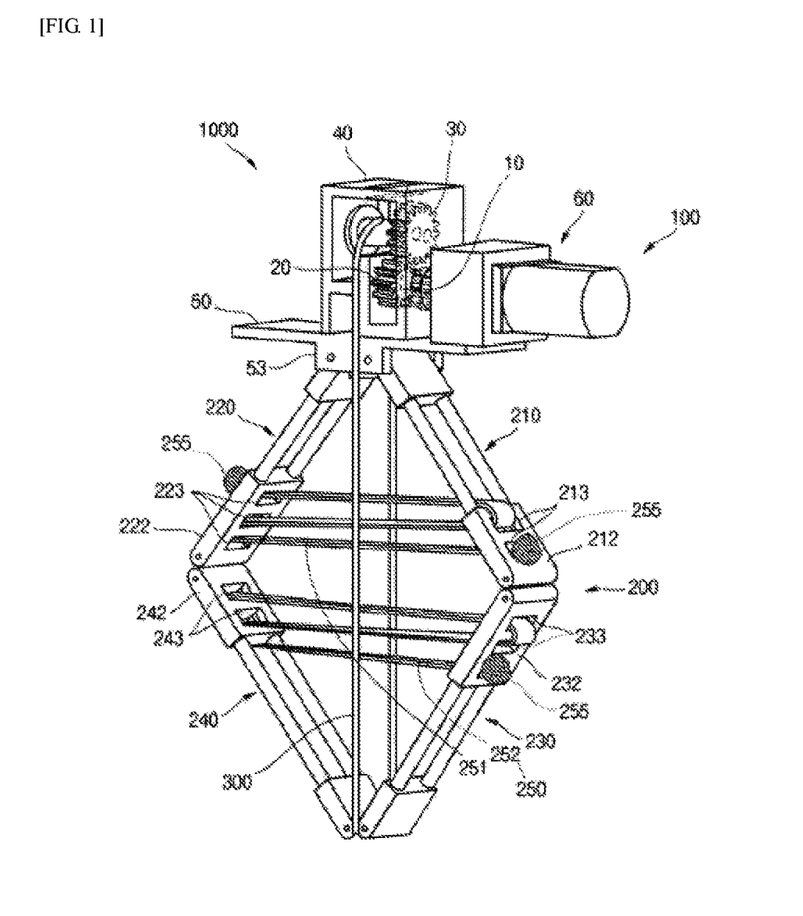
FIG. 1 is a perspective view of a hopping robot including an active clutch mechanism.
Figure 2:
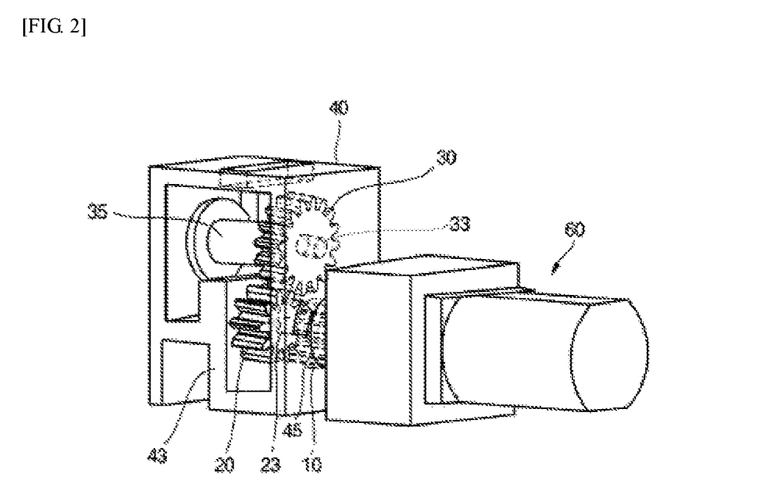
FIG. 2 is an enlarged perspective view of the active clutch mechanism in FIG. 1.
Figure 3:
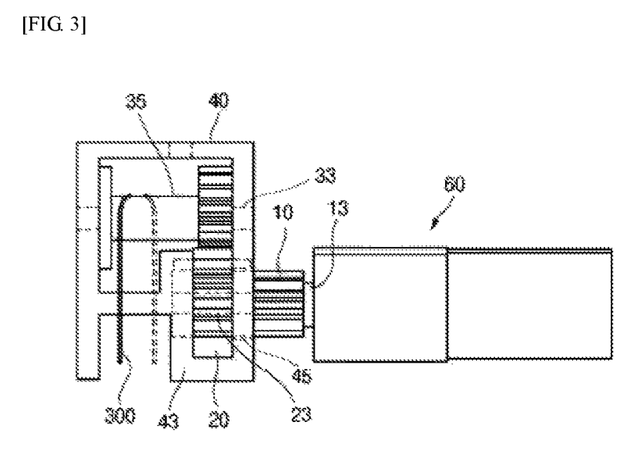
FIG. 3 is a front view of FIG. 2 when viewed from a front.

FIG. 1 is a perspective view of a hopping robot including an active clutch mechanism, and FIG. 2 is an enlarged perspective view of the active clutch mechanism in FIG. 1. Further, FIG. 3 is a front view of FIG. 2 when viewed from a front.

Hereinafter, structures of an active clutch mechanism 100 and a hopping robot 1000 having the same will be described with reference to FIGS. 1 to 3.

The active clutch mechanism 100 of the present invention includes a sun gear 10, a planetary gear 20, and a winding gear 30.

The sun gear 10 includes a rotation shaft 13. The rotation shaft 13 of the sun gear is connected to a motor 60 so that the sun gear 10 receives a driving power of the motor 60. When a power source is supplied, the motor 60 rotates and transmits the power to the sun gear 10 through the rotation shaft 13. The sun gear 10 is configured to rotate around the rotation shaft 13 and transmit the power to the planetary gear 20.

The sun gear 10 has an outer circumference on which protrusions or gear teeth may be formed to protrude at regular intervals. Contacts between the sun gear 10, the planetary gear 20 and the winding gear 30, which will be described below, cause protrusions or gear teeth formed on outer circumferences of the gears to be brought into contact with each other and be rotated, thereby inter-transmitting the power.

The planetary gear 20 may be arranged to come into contact with the sun gear 10. As an example, the planetary gear 20 may be arranged to always come into contact with the sun gear 10. The planetary gear 20 is configured to revolve around the sun gear 10 and is configured to revolve by a predetermined distance. As an example, the planetary gear 20 may be configured to revolve around the rotation shaft 13 of the sun gear in a circumferential direction by the predetermined distance.

A rotation shaft 23 of the planetary gear may be arranged on a guide portion formed in an inner side plate 43 which will be described below. As an example, the rotation shaft 23 of the planetary gear may be inserted into a cut-out portion 43a of the inner side plate 43. As a result, the protrusions or gear teeth formed on the outer circumference of the planetary gear 20 are brought into contact with the sun gear 10 to revolve by the predetermined distance. The rotation shaft 23 of the planetary gear is configured to be spaced apart from the rotation shaft 13 of the sun gear.

The planetary gear 20 has the outer circumference on which the protrusions or gear teeth may he formed to protrude at regular intervals.

When the sun gear 10 is rotated in one direction, the planetary gear 20 revolves around the sun gear 10 in the one direction to be brought into contact with the winding gear, thereby transmitting energy to the winding gear 30. Further, when the sun gear 10 is rotated in a direction different from the one direction, the planetary gear 20 revolves around the sun gear 10 in the direction different from the one direction to be spaced from the winding gear 30, thereby discharging the energy stored in an energy storage portion.

The energy storage portion may be a wire 300 installed on a pulley 35 connected to the winding gear 30 which will be described below, first to fourth links 210, 220, 230, and 240 connected to the wire 300, or elastic members 251 and 252.

Also, the energy may be stored in or discharged from the first and second elastic members 251 and 252, which will be described below, in the form of elastic energy.

The winding gear 30 may he arranged to he selectively brought into contact with the planetary gear 20 and to be rotatable by the rotation of the planetary gear 20 in a state of being in contact with the planetary gear 20. A rotation shaft 33 of the winding gear may be rotatably connected to a casing 40 which will be described below. The wire 300 may be wound around an outer circumference of the rotation shaft 33 of the winding gear. Accordingly, the wire 300 may be wound or unwound as the winding gear 30 is rotated. A separate pulley 35 is further installed on the rotation shaft 33 of the winding gear and the wire 300 is wound around the pulley 35 so that the wire 300 may wound around or unwound from the pulley 35. Of course, the rotation shaft 33 of the winding gear and the pulley 35 may also be formed of one member.

The active clutch mechanism 100 may further include the casing 40, a support plate 50, and the links 210, 220, 230, and 240.

The casing 40 may accommodate the sun gear 10, the planetary gear 20, and the winding gear 30. Referring to FIG. 2, an example in which the casing 40 is formed in a hexahedral shape to accommodate the plurality of gears 10, 20, and 30 is shown. However, the shape of the casing 40 is not limited thereto, but the casing 40 may be formed in various shapes which may accommodate the plurality of gears 10, 20, and 30.

The casing 40 may include the inner side plate 43 configured to support the planetary gear 20. The inner side plate 43 may include a guide portion configured to guide the rotation shaft 23 of the planetary gear so that the planetary gear 20 may revolve in a circumferential direction of a center of the rotation shall 13 of the sun gear by a predetermined distance. As an example, the guide portion may be the cut-out portion 43a formed by being cut from the inner side plate 43 to accommodate the rotation shaft 23 of the planetary gear.

Figure 6:
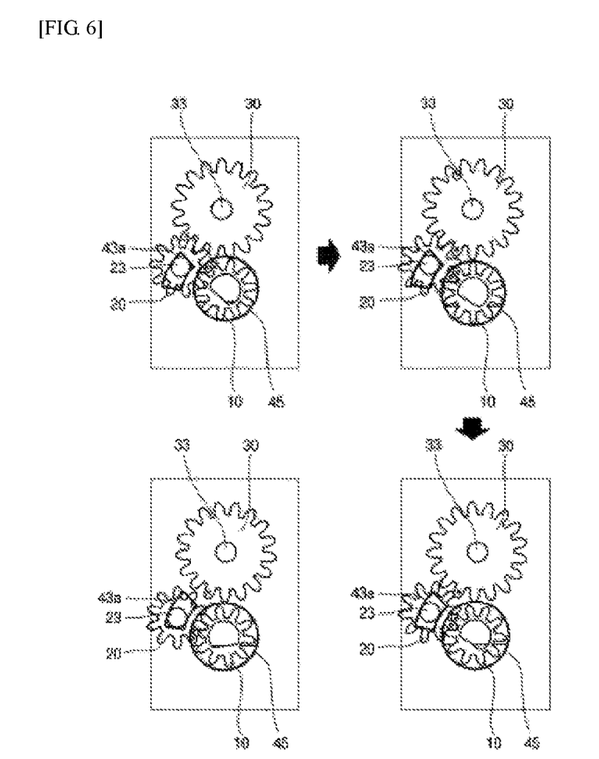
FIG. 6 is a conceptual view illustrating a process in which the planetary gear is spaced apart from the winding gear to discharge the energy.

The cut-out portion 43a may be formed by being cut by the predetermined distance in the circumferential direction of the rotation shaft of the sun gear to move the planetary gear 20 on the outer circumference of the sun gear 10 by the predetermined distance. Referring to FIG. 6, an example in which the cut-out portion 43a is formed in a quadrangular shape in a circular arc direction is shown. The inner side plate 43 may be formed in parallel with an outer wall of the casing 40.

Accordingly, the rotation shaft 23 of the planetary gear is configured to be reciprocally movable between one side and the other side of the cut-out portion 43a so that the planetary gear 20 is selectively brought into contact with the winding gear 30 through a revolving movement while being in contact with the sun gear 10.

Also, a sun gear guide portion 45 may be formed on the casing 40. The sun gear guide portion 45 is configured to be spaced apart from a part of the outer circumference of the sun gear 10. A part of the sun gear 10 may he arranged inside the case by the sun gear guide portion 45 and the rotation shaft 13 of the sun gear may be connected to the motor 60 outside the case. Further, the rotation shah 33 of the winding gear or the pulley 35 may be rotatably inserted into the outer wall of the casing 40.

The support plate 50 may be installed at one end of the casing 40. An example in which the support plate 50 is installed at a lower end portion of the casing 40 is shown in FIG. 1. The support plate 50 includes a coupling portion 53 which is formed in a downward direction to rotatably couple one end of each of the first and second links 210 and 220, which will be described below.

The support plate 50 is configured to support the casing 40. The motor 60 configured to provide the power to the active clutch mechanism 100 may he installed on the support plate 50, and an example in which the motor 60 is installed on one side of an upper surface of the support plate 50 is shown in FIG. 1.

The links 210, 220, 230, and 240 may be installed in the coupling portion, supported by the wire 300, and vertically arranged to he folded by the winding of the wire, and the links 210, 220, 230, and 240 will be described in more detail in the description of the hopping robot 1000, which will be described below.

Meanwhile, the hopping robot 1000 of the present invention includes the above-described active clutch mechanism 100. The hopping robot 1000 includes the active clutch mechanism 100, the first to fourth links 210, 220, 230, and 240, the pulley 35, and the wire 300.

Since the active clutch mechanism 100 has been described above, a configuration to be coupled to the active clutch mechanism 100 in the hopping robot 1000 will be described below.

The first to fourth links 210, 220, 230, and 240 may form a link portion 200. One end of each of the first and second links 210 and 220 is rotatably installed in the coupling portion 53 of the support plate 50. The other end of each of the first and second links 210 and 220 is rotatably connected to one end of each of the third and fourth links 230 and 240. To this end, rollers may be installed in portions in which each of the first and second links 210 and 220 and each of the third and fourth links 230 and 240 is connected to each other to withstand loads. As an example, first to fourth connection portions 212, 222, 232, and 242 may be respectively installed at the ends of the first to fourth links 210, 220, 230, and 240, and also, the rollers may be installed on the first and fourth connection portions 212 and. 242. Accordingly, in a state of being compressed or stretched, there may be no damage between the first and third links 210 and 230 and between the second and fourth links 220 and 240, the elastic energy is able to be stored and discharged, and a height of the hopping robot 1000 may be adjusted.

A plurality of holding portions 213, 223, 233, and 243 may be formed in the first to fourth connection portions 212, 222, 232, and 242. The plurality of holding portions 213, 223, 233, and 243 may be formed to pass through the first to fourth connection portions 212, 222, 232, and 242 from each surface thereof to the other surfaces thereof. An example in which the holding portions 213, 223, 233, and 243 are formed in the first to fourth connection portions 212, 222, 232, and 242 in a plurality of rectangular shapes is shown in FIG. 1. Accordingly, the plurality of holding portions 213, 223, 233, and 243 are formed to pass through each of the plurality of connection portions, and thus an elastic member 250 may be installed to be held on the holding portions 213, 223, 233, and 243.

The plurality of holding portions 213, 223, 233, and 243 formed in the first to fourth connection portions 212, 222, 232, and 242 may be referred to as first to fourth holding portions 213, 223, 233, and 243, respectively.

The first holding portion 213 is formed in the first connection portion 212 provided at an end of the first link 210 shown in the right upper end of FIG. 1, and as an example, two first holding portions 213 may be formed.

Also, the second holding portion 223 is formed in the second connection portion 222 provided at an end of the second link 220 shown in the left upper end of FIG. 1, and as an example, three second holding portions 223 may be formed.

The third holding portion 233 is formed in the third connection portion 232 provided at an end of the third link 230 shown in the right lower end of FIG. 1, and as an example, three third holding portions 233 may be formed.

Also, the fourth holding portion 243 is formed in the fourth connection portion 242 provided at an end of the forth link 240 shown in the left lower end of FIG. 1, and as an example, two forth holding portions 243 may be formed.

Meanwhile, the elastic members 251 and 252 are installed between the first to fourth links 210, 220, 230, and 240 to allow the elastic energy to be stored and the stored elastic energy to be discharged at the desired time. Referring to FIG. 1, an example in which the elastic members 251 and 252 are respectively installed between the first and second links 210 and 220 and between the third and fourth links 230 and 240 is shown.

The elastic member 250 may include the first and second elastic members 251 and 252.

The first elastic member 251 is installed between the first and second links 210 and 220 and installed to be alternatively held from the uppermost second holding portion 223 of the second connection portion 222 to the lowest first holding portion 213 of the first connection portion 212.

Likewise, the second elastic member 252 installed between the third and fourth links 230 and 240 is installed to be alternatively held from the uppermost fourth holding portion 243 of the fourth connection portion 242 to the lowest third holding portion 233 of the third connection portion 232.

Fixing members 255, which are installed to prevent the elastic members 251 and 252 from being separated from the first to fourth connection portions 212, 222, 232, and 242, may be coupled to ends of the first and second elastic members 251 and 252.

Meanwhile, materials of the elastic members 251 and 252 may include, for example, latex.

The wire 300 is installed to compress or stretch the first to fourth links 210, 220, 230, and 240. Referring to FIG. 1, the wire 300 may be arranged in a vertical direction to compress or stretch the first to fourth links 210, 220, 230, and 240.

In a state in which the first to fourth links 210, 220, 230, and 240 are compressed, the first to fourth links 210, 220, 230, and 240 may be arranged in relatively parallel with the ground, and thus the elastic members 251 and 252 are stretched to store the elastic energy.

On the contrary, in a state in which the first to fourth links 210, 220, 230, and 240 are stretched, the first to fourth links 210, 220, 230. and 240 may be arranged in a direction relatively crossing with the ground, and thus the elastic members 251 and 252 are compressed to discharge the stored elastic energy.

One side of the wire 300 is configured to be wound around the pulley 35, and the other side of the wire 300 is wound around a contact portion 247 between the third and fourth links 230 and 240.

The contact portion 247 is provided between the third and fourth links 230 and 240. The contact portion 247 may be configured to fix the wire 300 between the third and fourth links 230 and 240 or may be formed by coupling a separate member between the third and fourth links 230 and 240. An example in which the wire 300 is wound around the contact portion 247 between the third and fourth links 230 and 240 is shown in FIG. 1.

Further, an accommodation portion (not shown) of the wire 300, which is configured to accommodate a portion of the wire 300 in a state in which the wire 300 is wound, may be provided in the casing 40.

Figure 4:
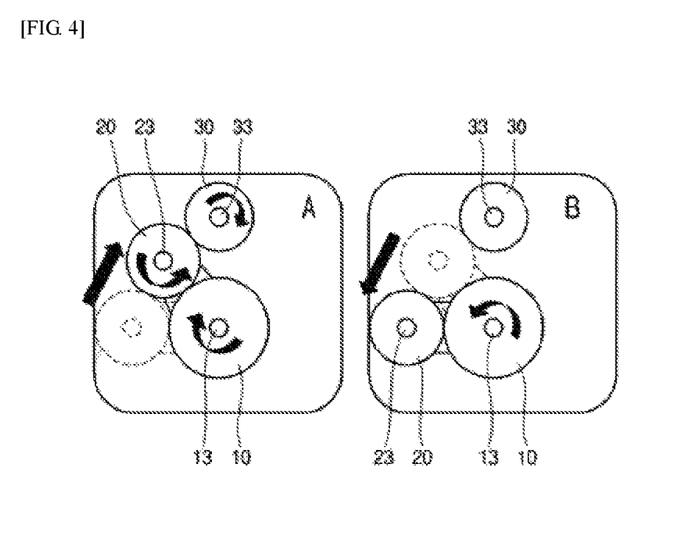
FIG. 4 is a conceptual view illustrating an operation principle of a sun gear, a planetary gear, and a winding gear.
Figure 5:
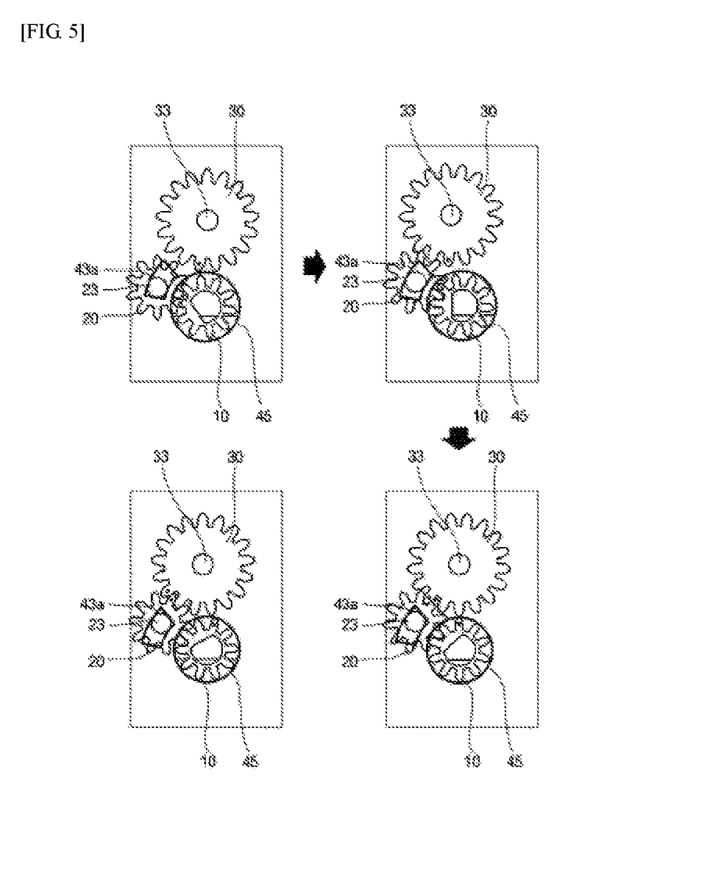
FIG. 5 is a conceptual view illustrating a process in which the planetary gear is brought into contact with the winding gear to store energy.

FIG. 4 is a conceptual view illustrating an operation principle of the sun gear 10, the planetary gear 20. and the winding gear 30, and FIG. 4A in FIG. 4 shows a state in which the planetary gear 20 is being brought into contact with the winding gear 30 and FIG. 4B in FIG. 4 shows a state in which the planetary gear 20 is being spaced apart from the winding gear 30. FIG. 5 is a conceptual view illustrating a process in which the planetary gear 20 is brought into contact with the winding gear 30 to store the energy and FIG. 6 is a conceptual view illustrating a process in which the planetary gear 20 is spaced apart from the winding gear 30 to discharge the energy.

Hereinafter, the process in which the elastic energy is stored or discharged will be described with reference to FIGS. 4 to 6.

When the power source is supplied to the motor 60, the sun gear 10 coupled to the motor 60 is rotated around the rotation shaft 13 in one direction. The planetary gear 20, which is brought into contact with the sun gear 10 and revolves in the one direction, moves to be brought into contact with the winding gear 30 and rotates the winding gear 30 in the one direction. The pulley 35 also rotates in the one direction together with the winding gear 30 by the rotation of the winding gear 30, and thus the wire 300 is wound and the contact portion 247 of the third and fourth links 230 and 240 moves upward. Here, the first and second elastic members 251 and 252 are stretched between the first to fourth links 210, 220, 230, and 240, and the elastic energy is stored in the first and second elastic members 251 and 252.

The motor 60 rotates the rotation shaft 13 of the sun gear in the other direction opposite to the one direction to discharge the elastic energy stored in the first and second elastic members 251 and 252. The planetary gear 20, which is brought into contact with the sun gear 10, revolves in the other direction to be spaced apart from the winding gear 30.

Accordingly, the wound wire 300 in a state in which the elastic energy is stored is unwound so that the elastic energy stored in the first and second elastic members 251 and 252 is discharged. As an example, the elastic energy stored in the first and second elastic members 251 and 252 may be discharged at the same time. Here, the third and fourth links 230 and 240 withdraw from the first and second links 210 and 220, and the contact portion 247 of the third and fourth links 230 and 240 withdraw from the coupling portion 53 of the support plate 50.

The active clutch mechanism 100 and the hopping robot 1000 having the same of the present invention allow the height of the hopping robot 1000 to be adjusted using the plurality of gears 10, 20, and 30 connected to each other and one actuator and allow the robot to hop at a desired time.

Also, the active clutch mechanism 100 and the hopping robot 1000 having the same of the present invention may store the elastic energy and discharge the stored elastic energy at the desired time.

The above-described active clutch mechanism 100 and the hopping robot 1000 having the same are not limited to the configuration and method of the embodiments described above, and the embodiments may be configured such that all or some of the embodiments are selectively combined so that various modifications are carried out.

The invention claimed is:

1. An active clutch mechanism comprising:
a sun gear connected to a motor and configured to be rotatable around a rotation shaft by receiving a driving power of the motor;
a planetary gear arranged to come into contact with the sun gear and configured to revolve around the sun gear, and which rotates around a rotation shaft spaced apart from the rotation shaft of the sun gear;
a winding gear selectively brought into contact with the planetary gear and configured to be rotatable around a rotation shaft by rotation of the planetary gear; and
a casing including an inner side plate for supporting the planetary gear,
wherein, when the sun gear is rotated in one direction, the planetary gear revolves around the sun gear in the one direction and comes into contact with the winding gear to rotate the winding gear and to wind a wire so that energy is stored in an energy storage portion connected to the winding gear,
when the sun gear is rotated in a direction opposite to the one direction, the planetary gear revolves around the sun gear in a direction different from the one direction to be spaced apart from the winding gear so that the energy stored in the energy storage portion is allowed to be discharged, and
wherein the inner side plate includes a guide portion configured to guide the rotation shaft of the planetary gear such that the planetary gear revolves in a circumferential direction of a center of the rotation shaft of the sun gear.

2. The active clutch mechanism of claim 1, further comprising:
a support plate including a coupling portion extending downward and installed at one end of the casing,
wherein the casing is configured to accommodate the sun gear, the planetary gear, and the winding gear.

3. The active clutch mechanism of claim 1, wherein the guide portion is a cut-out portion formed by being cut from the inner side plate to allow the planetary gear to revolve in the circumferential direction of the center of the rotation shaft of the sun gear, and the rotation shaft of the planetary gear is arranged in the cut-out portion.

4. The active clutch mechanism of claim 3, wherein the rotation shaft of the planetary gear is configured to move to one side of the cut-out portion for the planetary gear to come into contact with the winding gear when the sun gear rotates in one direction, and the rotation shaft of the planetary gear is configured to move to the other side of the cut-out portion for the planetary gear to be spaced apart from the winding gear when the sun gear rotates in a direction opposite to the one direction.

5. The active clutch mechanism of claim 1, wherein the energy storage portion is made of an elastic material, and the energy stored in the energy storage portion is elastic energy.

6. The active clutch mechanism of claim 1, wherein a wire, which is configured to be wound or unwound according to the rotation of the winding gear, is installed between the rotation shaft of the winding gear and the energy storage portion, and the wire transmits a driving power from the winding gear to the energy storage portion.

7. The active clutch mechanism of claim 6, further comprising:
a casing configured to accommodate the sun gear, the planetary gear, and the winding gear;
a support plate including a coupling portion extending downward and installed at one end of the casing; and
a link which is installed in the coupling portion, supported by the wire, and vertically arranged to be folded by the winding of the wire.

8. A hopping robot comprising:
a sun gear connected to a motor and configured to be rotatable around a rotation shaft by receiving a driving power of the motor;
a planetary gear arranged to come into contact with the sun gear and configured to revolve around the sun gear, and which rotates around a rotation shaft spaced apart from the rotation shaft of the sun gear;
a winding gear selectively brought into contact with the planetary gear and configured to be rotatable by rotation of the planetary gear;
a casing configured to accommodate the sun gear, the planetary gear, and the winding gear;
a support plate including a coupling portion extending downward and installed at one end of the casing;
first and second links, each of which having one end rotatably installed in the coupling portion;
third and fourth links rotatably installed at the other ends of the first and second links, respectively, and including a contact portion at which one ends thereof are brought into contact with each other;
a pulley connected to the winding gear to rotate with the winding gear; and
a wire installed to be wound around the pulley and the contact portion to compress or stretch the first to fourth links,
wherein when the sun gear is rotated in one direction, the planetary gear revolves around the sun gear in the one direction and comes into contact with the winding gear to rotate the winding gear so that the first to fourth links are compressed to store energy,
when the sun gear is rotated in a direction opposite to the one direction, the planetary gear revolves around the sun gear in the direction opposite to the one direction and is spaced apart from the winding gear to discharge the energy, and
wherein the casing includes an inner side plate which supports the planetary gear, and the inner side plate includes a guide portion configured to guide the rotation shaft of the planetary gear so that the planetary gear revolves in a circumferential direction of a center of the rotation shaft of the sun gear.

9. The hopping robot of claim 8, further comprising an elastic member installed in the first to fourth links in an intersecting direction, and elastically deformed by an operation of the first to fourth links,
wherein the energy is elastic energy which is stored and discharged through the elastic member.

10. The hopping robot of claim 9, wherein the elastic member is extended in a direction intersecting with a direction in which the first to fourth links are stretched or compressed, and configured to be compressed to store the elastic energy when the first to fourth links are stretched and to be stretched to discharge the elastic energy when the first to fourth links are compressed.

11. The hopping robot of claim 10, wherein first and second holding portions are respectively formed at ends of the first and second links, and third and fourth holding portions are respectively formed at ends of the third and fourth links, and the elastic member includes:
- a first elastic member installed in the first and second holding portions to be held in a direction intersecting with the wire; and
- a second elastic member installed in the third and fourth holding portions to be held in the direction intersecting with the wire.

12. The hopping robot of claim 11, wherein materials of the first and second elastic members include latex.

13. The hopping robot of claim 8, wherein the guide portion is a cut-out portion formed by being cut from the inner side plate to allow the planetary gear to revolve in the circumferential direction of the center of the rotation shaft of the sun gear, and the rotation shaft of the planetary gear is arranged in the cut-out portion.

14. The hopping robot of claim 13, wherein the rotation shaft of the planetary gear is configured to move to one side of the cut-out portion to come for the planetary gear into contact with the winding gear when the sun gear rotates in one direction, and the rotation shaft of the planetary gear is configured to move to the other side of the cut-out portion for the planetary gear to be spaced apart from the winding gear when the sun gear rotates in the other direction opposite to the one direction.

15. The hopping robot of claim 8, wherein the wire and the first to fourth links are arranged in a direction parallel to each other in a state in which the first to fourth links receives to a tensile force.

* * * * *